United States Patent [19]

Stone

[11] Patent Number: 5,802,304
[45] Date of Patent: Sep. 1, 1998

[54] AUTOMATIC DIALER RESPONSIVE TO NETWORK PROGRAMMING INTERFACE ACCESS

[75] Inventor: Jeremy Daniel Stone, Bellevue, Wash.

[73] Assignee: Microsoft Corporation, Redmond, Wash.

[21] Appl. No.: 634,244

[22] Filed: Apr. 18, 1996

[51] Int. Cl.$^6$ ........................................................ G06F 9/44
[52] U.S. Cl. ............................... 395/200.57; 395/200.58; 395/710; 395/682; 395/685
[58] Field of Search ................ 395/200.02, 200.06, 395/200.2, 710, 200.57, 200.58, 682, 685

[56] References Cited

U.S. PATENT DOCUMENTS 5,596,574  1/1997  Perlman et al. ..................... 370/389

OTHER PUBLICATIONS

Kronick, S.; *Netscape Navigator Handbook*; pp. 13–14 (Aug. 1995).
Tattam, P.; *Trumpet Winsock Handbook Version 2.0*; Ch. 1 (1993).
D. Dougherty et al.; *The Mosaic Handbook for Microsoft Windows*; p. 17–21 (1994).
Banks, M.; *Welcome to Compuserve for Windows*; pp. 53–69; 241–280; 313–330 (1994).
Morphet, J.; *Windows on the Internet: The Complete Toolchest on CD–ROM*; (Oct. 1995).
Screen shots of *Compuserve for Windows 3.0*; (Jul. 1996).
Screen shots of *America Online for Windows 2.5*; (1995).

*Primary Examiner*—Kenneth S. Kim
*Attorney, Agent, or Firm*—Klarquist Sparkman Campbell Leigh & Whinston, LLP

[57] ABSTRACT

A system provides automatic modem dialing for a dial-up connection to a computer network with an automatic dialer when a network application attempts to communicate with the network. The automatic dialer is installable in a network programming interface to monitor the network application's requests to communicate on the computer network through the network programming interface. Dialing user interfaces and dialogs are installable in the automatic dialer on a per dial-up connection basis. Their installability allows the automatic dialer to be implemented separately from the network programming interface, and the dialing user interface and dialogs to be implemented separately from the automatic dialer. The network application has an offline browsing mode which allows viewing of information recently accessed from the computer network while being disconnected from the computer network.

29 Claims, 6 Drawing Sheets

AUTOMATIC DIALER RESPONSIVE TO NETWORK PROGRAMMING INTERFACE ACCESS

FIELD OF THE INVENTION

This invention relates generally to computer-to-computer networking involving a dial-up connection, and sore particularly relates to automating the dial-up connection for reliable network operation.

BACKGROUND AND SUMMARY OF THE INVENTION

Computer network connections commonly are of two different types: dial-up network connections and dedicated network connections. Dial-up network connections generally are created by a computer employing a modem device connected to a public telephone system (or like switched communications network). With the modem, the computer dials on the telephone system to connect to a modem of another computer (generally a communications server computer such as for an Internet access provider with a dedicated connection to other computers on the network) to obtain the network connection. Such dial-up connections are dynamic and flexible in nature. Depending on the telephone number dialed with the modem, the computer can establish dial-up connections with the modem to any of numerous other computers and computer networks. Also, so as to avoid incurring hourly on-line service or access charges and telephone usage charges or simply to allow other use of the telephone line, typical dial-up connections are ordinarily disconnected from other computers and computer networks and connected to the network only as needed (i.e., during a user's on-line session at the computer).

On the other hand, dedicated network connections are made between a specific pair of computers that are directly wired together, such as in an Ethernet, token-ring or star network configuration. Such dedicated network connections generally are persistent in nature. Changing which computers are linked by the dedicated network connection generally requires physically rewiring the connection. In typical use, dedicated network connections between computers are maintained in a connected state. The dedicated network connection therefore is ordinarily available barring a physical break in the wire or a power outage or other failure of one of the computers.

In general, because of the dynamic nature of dial-up network connections, software for communicating via a dial-up network connection must establish the connection for each of a user's on-line sessions. Typically, such software have provided manual controls for initiating modem dialing and hanging up to connect and disconnect a dial-up network connection. For example, most general purpose communications software for personal computers (e.g., ProComm, and many others) include user interface controls, such as hot keys, commands, menu selections, buttons, etc., which a user activates to manually control connecting and disconnecting of a dial-up network connection. Likewise, most access software for particular commercial on-line services (e.g., CompuServe, America On-Line, Prodigy, and others) also have provided user interface controls which the user activates to manually control a dial-up connection. Even further, some prior Internet browsing software, such as the Navigator by Netscape Communications Corporation, and Mosaic by the National Center for Supercomputing Applications, do not include any dialing control and require the user to separately establish a network connection (e.g., by dialing with a separate dialing software or by having a dedicated network connection set up).

By contrast, due to the persistent nature of dedicated network connections, it usually is not necessary for software communicating via a dedicated network connection to control connecting and disconnecting. For this reason, most software for communicating via a dedicated network connection simply attempt communication on the dedicated network connection, without first checking that the connection actually is available. If the dedicated network connection is unavailable (such as from physically breaking or interrupting the wire or failure of the remote computer), the software simply returns an error or failure of the communications attempt.

An example of software for communicating via dedicated network connections is the sockets network programming interface which was originally developed for the UNIX computer operating system (hereafter the UNIX sockets). The UNIX sockets provide an interprocess communication facility which can be used for communicating over a network, such as the Internet. (The Internet is a well known, world-wide network of cooperatively interconnected computer networks. There are now millions of individual computers interconnected through the Internet.) The UNIX sockets are implemented as a set of services or functions which are accessed by application software through a set of application programming interfaces (APIs). By calling these APIs, the application program can utilize the UNIX sockets functions to communicate with a remote computer via the dedicated network connection. Because the computer is expected to be connected via a dedicated network connection, UNIX sockets does not provide any way for the application program to check whether the computer actually is connected to a network or request that the computer be connected to a network.

For use by application software to communicate on the Internet, Microsoft's Windows operating system has a network programming interface component known as Windows sockets which is based on the UNIX sockets. The Windows sockets is implemented in the Windows operating system as a dynamic link library named WSOCK32.DLL. (A prior version for 16-bit software is implemented in a filed named WINSOCK.DLL.) Like UNIX sockets, Windows sockets implements functions for communicating over a network connection to the Internet and provides a similar set of application programming interfaces which can be called by application software to utilize the network services. Also like UNIX sockets, Windows sockets does not provide any application programming interface with which the application software can check whether a network connection exists or request that a network connection be made. Thus, application software such as an Internet browser which utilizes Windows sockets for communicating on the Internet generally do not control the computer's connection to the Internet, but rather simply call the Windows sockets APIs to communicate over the Internet. Such calls to the Windows sockets APIs may succeed or fail to communicate on the Internet depending on whether the computer currently has a network connection to the Internet.

A problem exists in that computers that run the Windows operating system use both dedicated network connections and dial-up network connections to access the Internet. In fact, for computers used in homes, access to the Internet predominantly is via a dial-up network connection. For computers that have a dedicated network connection to the Internet, application software can access the Internet through Windows sockets in the usual way (i.e., by simply calling Windows sockets APIs to communicate on the Internet without first establishing a connection or checking that a connection exists). Where the computer uses a dial-up connection to the Internet, however, the dial-up connection to the Internet usually needs to be established by dialing to an Internet access provider before the application software can successfully call Windows sockets APIs to communicate on the Internet.

A possible solution to this problem is for the application software to establish the dial-up connection on its own outside the Windows sockets network programming interface, when the computer running the application utilizes a dial-up connection for Internet access. For example, an Internet browser application can provide a user interface control which the user must manually activate to initiate connecting via a modem to an Internet access provider before the application will attempt any communications on the Internet through the Windows sockets interface. In this manner, the computer will have a dial-up connection to the Internet before the application makes use of Windows sockets. However, this solution has drawbacks in that the application software must differentiate between a dial-up network connection and a dedicated network connection and interact with the dial-up network connection outside of Windows sockets, which increases the complexity of the application software. Further, each application software using this approach is likely to require separately setting up by the user to properly control the dial-up connection, which for novice users can be a difficult and confusing task (and burdensome to even experienced computer users).

In accordance with one aspect of the present invention, a network interface layer (such as an implementation of Windows sockets) includes an automatic dialer. Where a computer utilizes a dial-up network connection to access a network (e.g., the Internet), the automatic dialer monitors calls from an application software running on the computer to certain of a set of application programming interfaces of the network interface layer to detect attempts to communicate on the network. When the automatic dialer determines that the application software is attempting to communicate on the network, the automatic dialer automatically initiates dialing to establish the dial-up connection. The network interface layer delays servicing the call to the application programming interface until after the automatic dialer completes the dial-up connection. Where the computer utilizes a dedicated network connection to access the network, the call to the application programming interface proceeds without initiating dialing by the automatic dialer. Accordingly, the application software is able to communicate on the network through the network interface layer in the same manner whether a dial-up network connection or a dedicated network connection is used.

In accordance with a further aspect of the invention, the automatic dialer is an installable component of the network interface layer. The network interface layer allows certain of its application programming interfaces to be monitored by the installable automatic dialer or other software module with a hook interface. The hook interface is a function exported by the installable automatic dialer or other monitoring software module for monitoring requests to these application programming interfaces. (In the computer software field, the term "hook" generally refers to the ability for one application to monitor or receive notification about function calls made by another application to yet a third application, a system component, or an application programming interface. A "hook interface" is a mechanism by which an application registers to receive notification information from a hook.)

The network interface layer calls the hook interface to provide notification when a request is made to these application programming interfaces. When the notification is received, the installable automatic dialer can then determine whether to dial with the modem for a dial-up connection. When the hook interface call returns, the network interface layer continues to service the application programming interface request. Thus, the automatic dialer or other monitoring software module is an installable component which can be implemented separately from the network interface layer. This allows a different automatic dialer or other monitoring software module to effectively be "plugged" into the network interface layer without having to replace the entire network interface layer.

In accordance with another aspect of the invention, the automatic dialer comprises one or more installable user interface handlers. When the automatic dialer detects from an application software's requests to application programming interfaces of the network interface layer that the application software is attempting to communicate on the network and a dial-up connection to the network has not yet been established, the automatic dialer invokes a user interface handler to display a dialog for the user to confirm or cancel dialing to establish the dial-up connection. The user interface handlers are installable in the automatic dialer per dial-up connection (each computer network or access provider which can be dialed from a modem is a separate dial-up connection even though made at separate times from a single modem). Thus, separate user interfaces can be installed for each of multiple computer networks or access providers.

According to yet another aspect of the invention, the application software for communicating on the network through the network interface layer has an off-line mode which allows the user to view information recently accessed on the network with the dial-up connection being disconnected. The user can then continue viewing the information without continuing to incur on-line or network access charges or telephone usage charges, or when it is not possible to continue the dial-up connection (such as from a laptop computer on an airplane). The application software maintains a data cache in which it temporarily stores recently accessed information. The application software initially is in an on-line mode in which the application software obtains information for viewing by the user from the network through the network interface layer (which triggers dialing by the automatic dialer if no dial-up connection exists). When the automatic dialer's user interface handler prompts the user to confirm dialing and the user instead chooses to cancel dialing, the application software switches to off-line mode. While in off-line mode, the application software accesses information for viewing by the user from the data cache. Periodically, the application software checks whether a dial-up connection has again been established, and if so resumes the on-line mode.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

Figure 1:
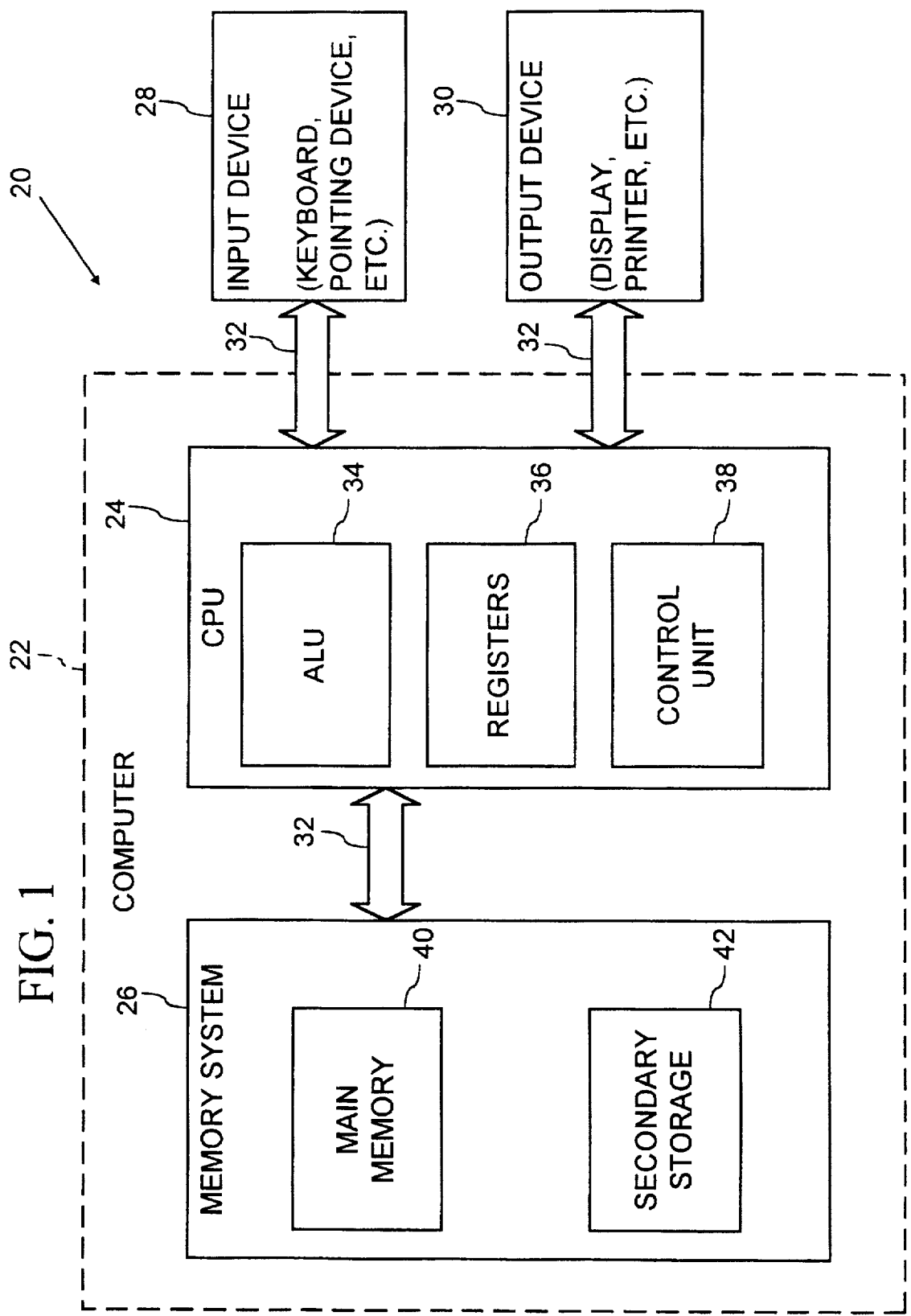
FIG. 1 is a block diagram of a computer system that may be used to implement a method and apparatus embodying the invention for automatic dialing and offline browsing.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26. In the illustrated embodiment of the present invention, the computer system 20 uses Microsoft Corporation's Windows® 95 operating system. However, other operating systems (e.g. Windows NT™, OS/2®, by IBM, etc.) could also be used.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Automatic Dialer System Overview

Figure 2:
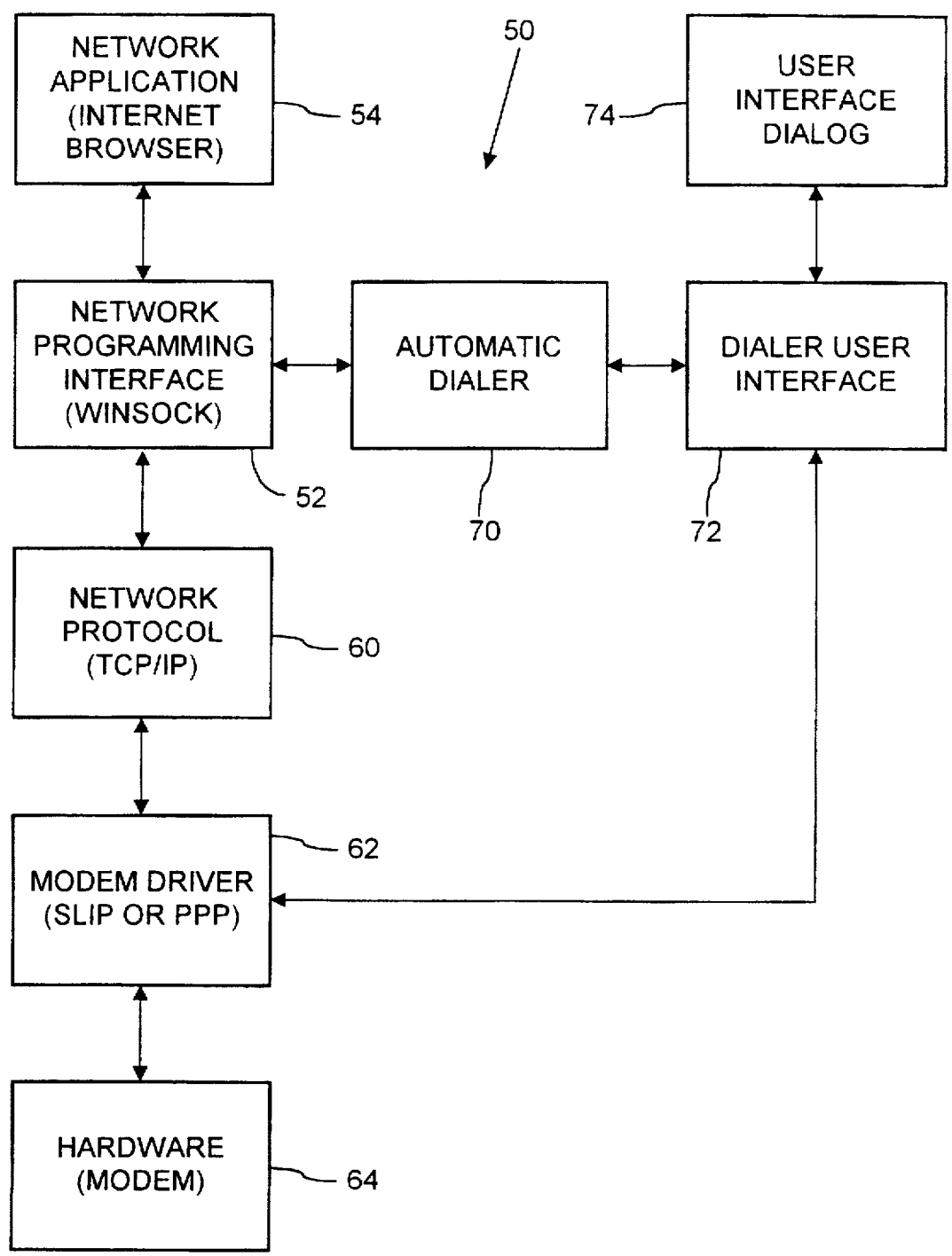
FIG. 2 is a block diagram of a system with installable automatic dialing, installable dialing user interface and offline network browsing mode according to the illustrated embodiment of the invention within a computer system such as shown in FIG. 1.

Referring to FIG. 2, a system 50 with installable automatic dialer, installable dialing user interfaces, and offline browsing according to the illustrated embodiment of the invention comprises a network programming interface 52. The network programming interface 52 in the illustrated embodiment of the invention is an implementation of the Windows sockets network programming interface. The illustrated network programming interface 52 is described as being for use in communicating on the Internet, but the invention is not so limited. The network programming interface 52 can be used for communicating on other networks, such as private computer networks (sometimes referred to as "intranets") and computer networks of commercial on-line services. Alternative embodiments of the invention also can be implemented on network programming interfaces 52 other than Windows sockets (e.g., pipes, etc.). (For expository convenience, the network programming interface 52 will hereafter be referred to as the Windows sockets 52.)

The Windows sockets 52 comprises a facility or set of services for inter-process communications, e.g., communications over the Internet or other network between a process (such as one associated with a network application software 54) on the computer 20 and a process executing on a remote computer. These services are implemented as a set of functions which are callable from a network application 54 using associated application programming interfaces (APIs). The functions are included in a dynamic link library file called WSOCK32.DLL. Dynamic link library files provide function libraries that applications can link to and call using regular function calls. Alternatively, the network programming interface 52 can be implemented using other file names and types.

The network application 54 is an application software program which communicates on the Internet or other network. The illustrated network application 54 is an Internet browser which a user of the computer system 20 (FIG. 1) can operate to access and view data from other computers on the Internet, and to compose and send data on the Internet. The network application 54 communicates on the Internet through the Windows sockets 52 by calling the Windows sockets' APIs.

The Windows sockets 52, in turn, relies on several lower layers of software and hardware which the functions of the Windows sockets call down into for communicating on the Internet. In the illustrated system 50, these lower layers comprise a network protocols layer 60, a modem driver layer 62, and a hardware layer 64. The hardware layer 64 is the lowest layer. Included in the hardware layer 64 is the modem, peripheral bus and ports, etc. which the computer system 20 uses as its physical connection to the Internet.

Each of the intermediate layers above the hardware layer 64, including the modem driver layer 62, the network protocols layer 60, and the Windows sockets 52 itself, provide a packaged set of functions which abstract network communications at decreasing levels of hardware and network specificity for the next higher layer.

The network protocols layer 60 comprises one or more protocol drivers that implement a set of functions which abstract communicating according to established protocols of the Internet for the Windows sockets 52. Network protocols are a set of rules defining how two computers on the Internet communicate. Computers connected to the Internet typically use the Transmission Control Protocol (TCP) and the Internet Protocol (IP) protocol suite to communicate.

TCP/IP is a layered set of protocols which conceptually is stacked vertically into layers. TCP is a transport layer that defines data flow, acknowledges data, and retransmits lost or damaged data. However, the User Datagram Protocol (UDP) is also commonly used as a transport layer in place of TCP. IP is a network layer that defines the format of data, and the basic unit of data transfer. TCP/IP provides a reliable, byte-stream-oriented virtual circuit for data transfer and is well known in the art. There are also application protocols in the Internet protocol suite including File Transfer Protocol (FTP), Simple Mail Transfer Protocol (SMTP), Hyper Text Transfer Protocol (HTTP), Gopher, etc. which use TCP/IP to pass data across the Internet.

As TCP/IP is the default transport/network protocol suite for communications with computers on the Internet, the network protocol layer 60 preferably communicates with TPC/IP. However, other protocol suites such the NetBIOS Extended User Interface(NetBEUI) by IBM(r) Corporation, Internet Packet Exchange/Sequenced Packet Exchange (IPX/SPX) by Novell(r) corporation, DECnet, by Digital Equipment Corporation, NetBIOS by Microsoft Corporation, and OSI/TP-4 could also be used. In addition UDP/IP can be used to provide an unreliable (i.e., no guaranteed delivery of data packets) byte-stream-orientated, connectionless (i.e., no virtual circuit) transport/network protocol suite for data transfer.

The modem driver layer 62 provides control of the dial-up connection to the Internet. The modem driver layer 62 comprises one or more drivers that implement functions for connection protocols and for directly controlling the operation of the hardware layer 64 (including the modem). The illustrated modem driver layer 62 preferably uses the Serial Line Protocol (SLIP) or the Point-to-Point Protocol (PPP) to connect to the Internet host with the modem. SLIP and PPP allow two computers to communicate using TCP/IP over a standard modem and telephone line dial-up connection, and typically provide full access to the set of available Internet protocols and services.

In the system 50, dialing to establish a dial-up connection to the Internet is accomplished by an automatic dialer 70. The automatic dialer 70 is installable to effectively "plug" into the Windows sockets 52 as described in more detail below. The automatic dialer 70 detects when the network application attempts to communicate on the Internet by monitoring requests to the APIs of the network programming interface 52. The automatic dialer 70 also checks whether a dial-up connection to the internet currently exists. When an attempt to communicate on the internet is detected and no dial-up connection exists, the automatic dialer 70 initiates a dialing procedure to establish a dial-up connection to the internet. Thus, the network application 54 can operate as if the computer system 20 (FIG. 1) has a dedicated network connection, and need not explicitly control the dial-up connection.

Figure 4:
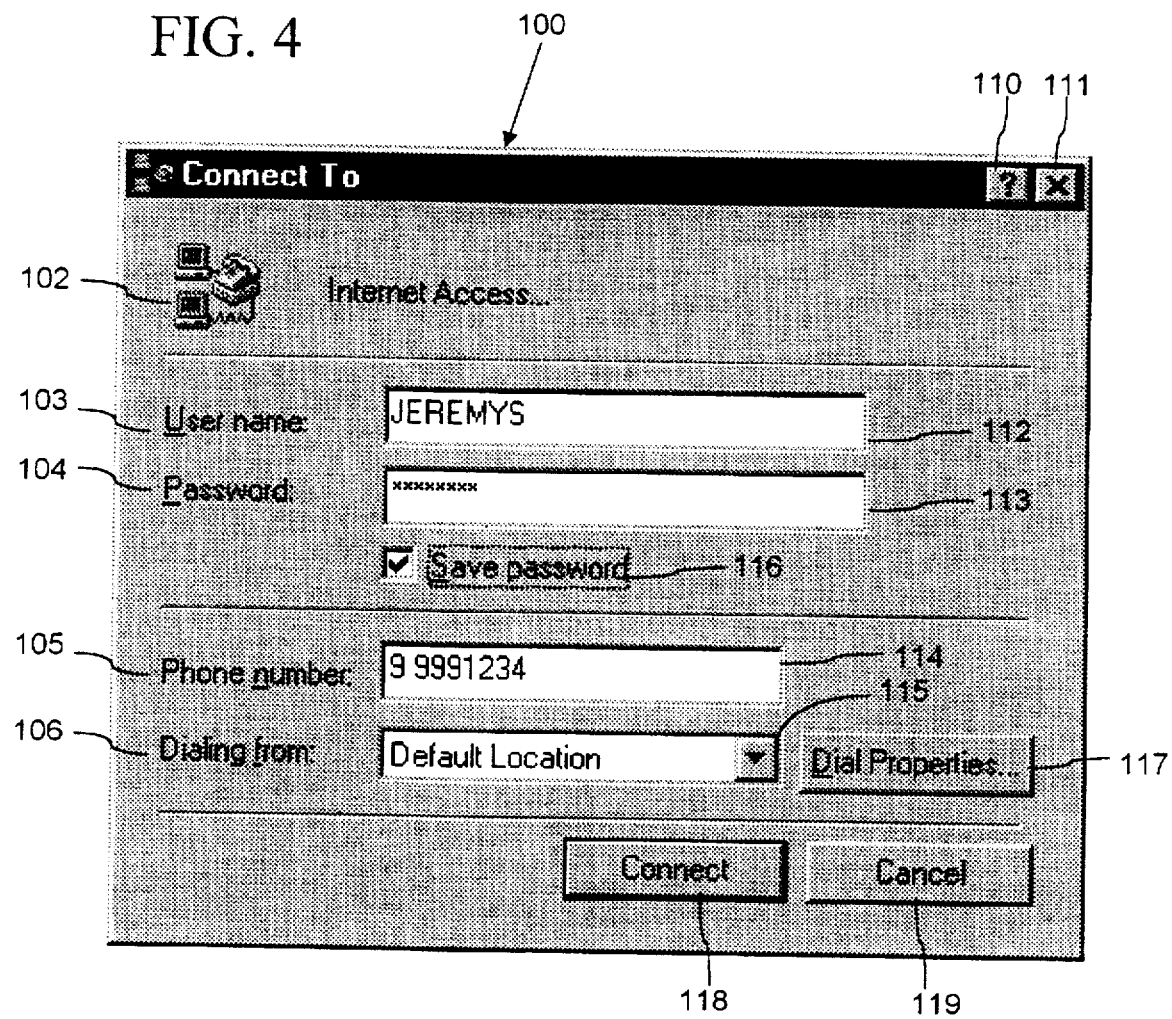
FIG. 4 is a view of a default dialog of an installable automatic dialer user interface in the system of FIG. 2.

For controlling the dialing procedure, the system 50 further comprises a dialer user interface 72 and user interface dialog 74. As described more fully below, the dialer user interface is installable on a per dial-up connection basis to effectively plug into the automatic dialer 70. When the automatic dialer 70 determines to initiate a dial-up connection, the automatic dialer 70 invokes the dialer user interface 72. The dialer user interface 72 presents the user interface dialog 74 for interacting with the user of the computer system 20 (FIG. 1). This allows the user to confirm or cancel dialing to establish the dial-up connection, and also to configure the dial-up connection such as by setting the phone number, log-on name, password, etc. FIG. 4 illustrates a default dialog described in more detail below for the user interface dialog 74.

Autodial Procedure

Figure 3:
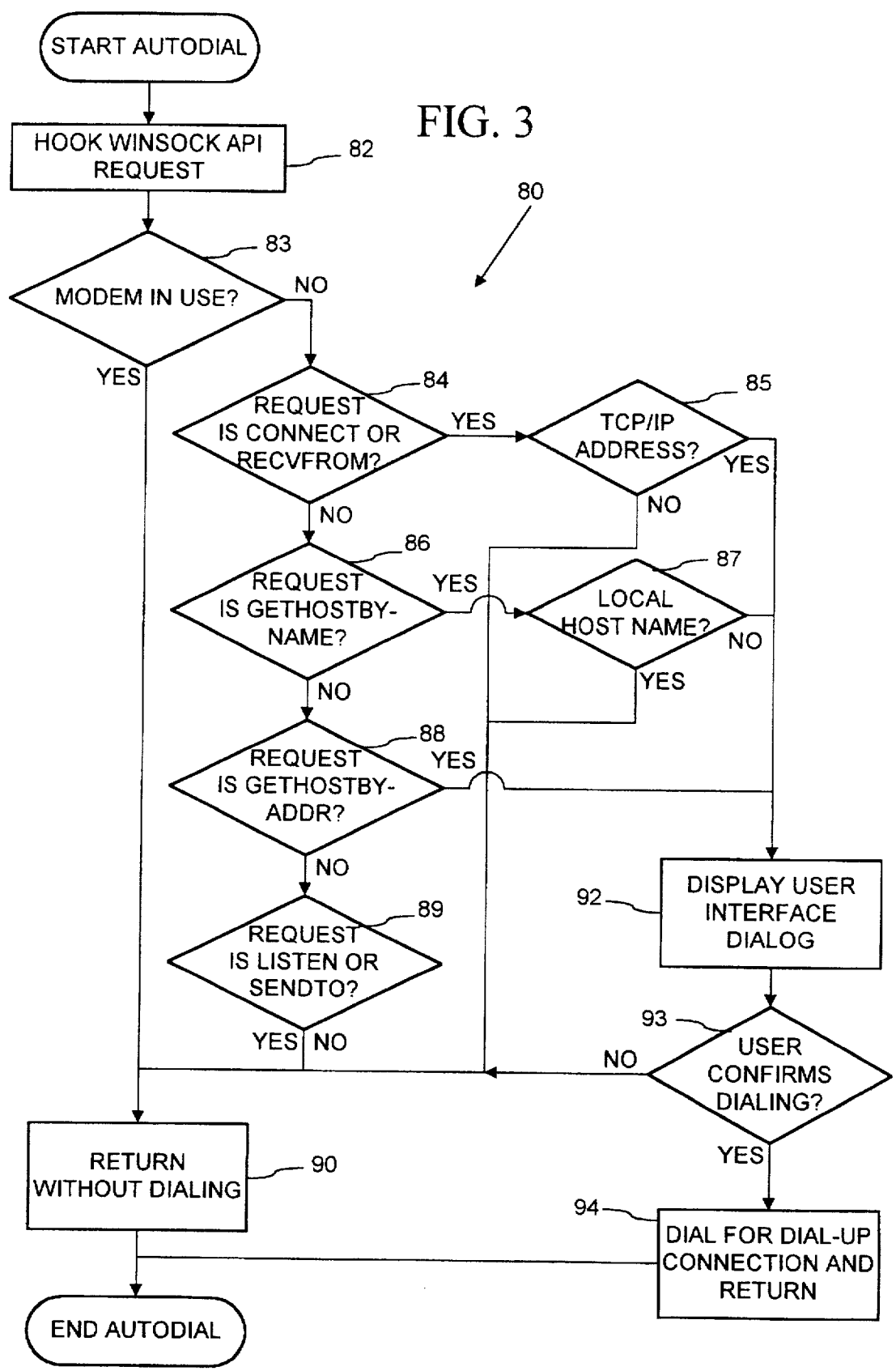
FIG. 3 is a flow chart of a process for automatic dialing in the system of FIG. 2.

Referring now to FIG. 3, the illustrated automatic dialer 70 and dialer user interface (FIG. 2) utilize an autodial method 80 for automatically establishing a dial-up connection as needed for the network application 54 (FIG. 2). This relieves the network application 54 from having to control the dial-up connection to ensure its existence during a user's on-line session. The autodial method 80 automatically establishes a dial-up connection when the network application first attempts to communicate on the internet in the on-line session, and automatically re-establishes the dial-up connection if it becomes disconnected during the on-line session (except during offline mode browsing described below).

At a first step 82 of the autodial method 80, the automatic dialer 70 hooks Windows sockets API requests so as to receive notification when the network application calls certain of the Windows sockets APIs that may indicate an attempt to communicate on the internet. The automatic dialer 70 hooks the Windows sockets APIs by installing an autodial hook call back function described in the installable automatic dialer section below. When the network application 54 calls certain of the Windows sockets APIs, the Windows sockets 52 in turn calls the autodial hook call back function with parameters specifying which Windows sockets API was requested by the network application and a relevant parameter of that Window sockets API request. The Windows sockets' call to the autodial hook call back function is synchronous. That is, the Windows sockets API request is blocked or effectively put "on hold" until the call returns (i.e., after the automatic dialer completes processing the autodial method 80, including dialing for the dial-up connection to the internet if needed). This allows the automatic dialer 70 to establish a dial-up connection before the Windows sockets 52 attempts to communicate on the internet.

In a next series of steps 83–89, the automatic dialer checks a number of conditions that determine whether dialing is appropriate. At step 83, the automatic dialer 70 checks whether a dial-up connection currently exists. If one currently exists, there is no need for dialing and the autodial method 90 returns without dialing at a step 90. If there currently is no dial-up connection, the autodial method 70 continues with the checks in steps 84–89.

The illustrated automatic dialer 70 checks whether a dial-up connection exists by checking whether the modem is currently in use for remote network access. In the illustrated system 50 (FIG. 2), the Windows® 95 operating system maintains a system registry which is a database for storing hardware and software configuration information. A remote network access (RNA) subsystem of the Windows® 95 operating system (which is associated with the above described Windows sockets 52, network protocols 60 and modem driver 62 components) manages dial-up connections with remote networks in the Windows® 95 operating system. The RNA subsystem dynamically updates a value (the RNA busy value) in the system registry that indicates whether the computer's modem currently is in use for a dial-up connection (although not necessarily a dial-up connection to a specific network, such as the internet). The RNA subsystem and system registry are conventional features of the Windows® operating system, and described in *Inside Windows® 95*, by Adrian King, Microsoft Press, 1994, among other references. The illustrated automatic dialer 70 therefore determines that a dial-up connection exists when the RNA busy value indicates that the modem is in use by the RNA subsystem, and that no dial-up connection currently exists if the RNA busy value indicates that the RNA subsystem is not busy. Alternatively, the automatic dialer can check for a dial-up connection in a Windows 95 computer system using a CreateFile API call on the modem, by polling a RasEnumConnections API, or by launching a separate process to be a telephony application programming interface (TAPI) application. Each of these alternative methods, however, are slower and more complex to implement. Alternative embodiments for computers with other operating systems can utilize like application programming interfaces of such operating systems for this check, or query the modem whether it is in use.

Since checking the RNA busy value is computationally expensive (i.e., slow) and the Windows sockets APIs may be called frequently (resulting in frequent repetitions of the autodial method 80), the check at step 83 also can be based on the assumption that the dial-up connection likely still exists if a recent check of the RNA busy value (or alternative dial-up connection check) yielded a dial-up connection exists result. The illustrated automatic dialer 70 performs the check based on this assumption by timing the interval since a last check of the RNA busy value (or alternative dial-up connection check). This can be done by storing a system clock tick count when the last check was made, and comparing the stored tick count to a current system clock tick count. If a check yielding a "dial-up connection exists" result was made within a predetermined prior interval (e.g., 3 seconds in the illustrated embodiment), the automatic dialer 70 (FIG. 2) determines that the dial-up connection still exists at step 83 based on this assumption and therefore proceeds to step 90 where it returns without dialing to the Windows sockets 52 (FIG. 2).

At steps 84–89, the automatic dialer 70 then performs checks of the Windows sockets API request and its parameter (which was hooked at step 82) to determine whether the network application is attempting to communicate on the internet. The Windows sockets API requests and their parameters that trigger dialing in the illustrated autodial method 80 are summarized in the following table 1.

| WinSock API | Conditions under which a prompt to dial is triggered |
| --- | --- |
| connect() | Only if address is in TCP/IP address family |
| recvfrom() | Only if address is in TCP/IP address family |
| gethostbyname() | Only if host name parameter is different from local host name; which can be either DNS host name or local computer name from registry |
| gethostbyaddr() | This API call always triggers a prompt to dial |
| listen() | This API call is always ignored |
| sendto() | This API call is always ignored |

As shown at steps 84–85, the automatic dialer determines that the network application is attempting to communicate on the internet if it hooks a "Connect" or "recvfrom" API request whose address parameter specifies a TCP/IP address. The autodial method 80 then continues to step 92 where the dialer user interface 72 (FIG. 2) is invoked to display the user interface dialog 74 for dialing a dial-up connection. If a "Connect" or "recvfrom" Windows sockets API request does not specify a TCP/IP address, then the automatic dialer 70 determines not to dial and proceeds to step 90 where it returns to the Windows sockets 52 without dialing.

As shown at steps 86–87, if the automatic dialer 70 hooks a "gethostbyname" API request, the automatic dialer checks whether the request's host name parameter specifies the name of the local computer (i.e., the computer system 20 on which the network application is run). Some network applications call the "gethostbyname" API to obtain a "hostent" data structure, without attempting to communicate on the Internet. Thus, the automatic dialer determines that the network application is attempting to communicate on the Internet if it hooks a "gethostbyname" API request whose host name parameter is other than the local host name. The autodial method 80 then continues to step 92 where the dialer user interface 72 (FIG. 2) is invoked to display the user interface dialog 74 for dialing a dial-up connection. If the host name parameter specifies the local host name, however, the automatic dialer 70 determines not to dial and proceeds to step 90 where it returns to the Windows sockets 52 without dialing.

As shown at step 88, whenever the automatic dialer 70 hooks a "gethostbyaddr" API request, the automatic dialer determines that the network application is attempting to communicate on the Internet. The autodial method 80 therefore continues to step 92 where the dialer user interface 72 (FIG. 2) is invoked to display the user interface dialog 74 for dialing a dial-up connection. As shown at step 89 on the other hand, when a "Listen" or "sendto" API request is hooked, the automatic dialer 70 determines not to dial and the autodial method 80 proceeds to step 90 where it returns to the Windows sockets 52 without dialing.

As indicated at the step 92, when the conditions for dialing are met, the automatic dialer 70 causes the dialer user interface 72 (FIG. 2) to display the user interface dialog 74 (FIG. 2) for the user to configure, confirm, or cancel dialing to establish the dial-up connection. As shown at a step 93, if the user cancels dialing, the autodial method 80 proceeds to step 90 where it returns to the Windows sockets 52 without dialing. In the illustrated system 50, this also switches the network application 54 into an offline browsing mode described in more detail below. However, if the user confirms dialing at step 93, the automatic dialer 70 dials to establish the dial-up connection to the Internet at step 94 before returning to the Windows sockets 52. After returning from step 90 or 94, the Windows sockets 52 continues processing the API request that was hooked at step 82.

Installable Autodial Handler

Referring again to FIG. 2, the Windows sockets 52 in the illustrated system 50 is implemented to allow hooking of its APIs by an installable component, such as the automatic dialer 70 (also referred to hereinafter as the installable automatic dialer 70), so as to monitor requests by the networking application to the APIs. This allows the installable automatic dialer to be written by a software developer as a separate component which effectively "plugs" into the Windows sockets 52. An implementation of the Windows sockets 52 therefore does not have to be written by a software developer from scratch to include functionality, such as automatic dialing, which relies on monitoring of API requests. Developing the installable automatic dialer 70 is a much easier task in comparison to the task of writing the Windows sockets from scratch. Thus, the feature of the Windows sockets with hookable APIs and the installable automatic dialer allows software developers to add autodialing or like Windows sockets monitoring software much more easily to the computer system 20 (FIG. 1).

For hooking of API requests, the windows sockets 52 includes code in the functions for each of the APIs which are to be monitored that calls a hook interface exported by the installable handler (e.g., the installable automatic dialer 70). The call to the hook interface is made before any processing of the API request is performed in the functions. The installable handler preferably is implemented as a DLL. The hook interface preferably has the following form:

```
VOID AutodialHandler(DWORD dwOpCode, LPCVOID lpparam);
``` where dwopcode is a parameter for specifying which of the Windows sockets APIs was requested by the network application, and lpParam is an API-dependent data which contains a relevant parameter of the requested API as summarized in the following table 2.

TABLE 2

| WinSock API | dwOpCode | lpParam |
|---|---|---|
| connect() | AUTODIAL_CONNECT | "name" parameter |
| gethostbyaddr() | AUTODIAL_GETHOSTBYADDR | "addr" parameter |
| gethostbyname() | AUTODIAL_GETHOSTBYNAME | "name" parameter |
| listen() | AUTODIAL_LISTEN | unused |
| recvfrom() | AUTODIAL_RECVFROM | "from" parameter |
| sendto() | AUTODIAL_SENDTO | "to" parameter |

In the illustrated Windows sockets 52, the ordinal values associated with the dwopCode parameter are determined by the following code:

```
// opcode ordinals for dwOpcode parameter in hook   1
#define AUTODIAL_CONNECT
#define AUTODIAL_GETHOSTBYADDR                      2
#define AUTODIAL_GETHOSTBYNAME                      3
#define AUTODIAL_LISTEN                             4
#define AUTODIAL_RECVFROM                           5
#define AUTODIAL_SENDTO                             6
```

Further, the code for calling the hook interface in the Windows sockets functions for the APIs that are monitored (e.g., "connect," "gethostbyaddr," "gethostbyname," "listen," "recvfrom," and "sendto") has the following form in the illustrated Windows sockets 52:

for the connect API:

```
if (g_pfnAutoDialHook)
    (*g_pfnAutoDialHook) (AUTODIAL_CONNECT,
    (LPCVOID) name);
``` for the gethostbyaddr API:

```
if (g_pfnAutoDialHook)
    (*g_pfnAutoDialHook) (AUTODIAL_GETHOSTBYADDR,
    (LPCVOID) addr);
``` for the gethostbyname API:

```
if (g_pfnAutoDialHook)
    (*g_pfnAutoDialHook) (AUTODIAL_GETHOSTBYNAME,
    (LPCVOID) name);
``` for the listen API:

```
if (g_pfnAutoDialHook)
    (*g_pfnAutoDialHook) (AUTODIAL_LISTEN,
    (LPCVOID) NULL;
``` for the recvfrom API:

```
if (g_pfnAutoDialHook)
    (*g_pfnAutoDialHook) (AUTODIAL_RECVFROM,
    (LPCVOID) from);
``` for the sendto API:

```
if (g_pfnAutoDialHook)
    (*g_pfnAutoDialHook) (AUTODIAL_SENDTO,
    (LPCVOID) to);
```

The installable automatic dialer 70 exports its hook interface for installing in the Windows sockets 52 by entering the following information in the Windows system registry:

```
HKEY_LOCAL_MACHINE\SystemCurrentControlSet\Services\
Winsock\Autodial
    AutodialDllName32 = <DLL file name>, REG_SZ
    AutodialFcnName32 = <exported name of function>,
REG_SZ
``` where <DLL file name> is the file name of the installable automatic dialer's dynamic-link library to load, and <exported name of function> is the exported name of the function that implements the installable automatic dialer's hook interface.

The Windows sockets 52 includes code to load the installable automatic dialer's DLL, and obtain the address of the hook interface. The Windows sockets 52 also includes code to unload the installable automatic dialer's DLL. This code is listed in the attached Appendix A.

The hook interface is to an autodial handler function in the installable automatic dialer 70. The autodial handler function implements the autodial method 80 (FIG. 3) in the illustrated embodiment, but alternatively can implement other functionality which monitors the network application's Windows sockets API requests.

Installable Autodial User Interface Handler

With reference now to FIG. 4, a default dialing dialog 100 for use as the user interface dialog 74 (FIG. 2) is a rectangular graphic for displaying on a display device of the computer system 20 (FIG. 1). The default dialing dialog 100 preferably comprises graphical and textual information 102–106 to prompt user input and a plurality of user interface controls 110–119 which a user activates with an input device (e.g., keyboard, mouse or the like). The user interface controls include text and drop down boxes 112–115 for configuring the dial-up connection, such as for entering a user name, a password, a phone number, and "dialing from" location. A dial properties button 117 opens a separate dialog with controls for configuring additional dialing properties of the dial-up connection. A check box 116 causes an input password to be saved for future dialing. A connect button 118 and a cancel button 119 allow the user to confirm or cancel dialing. A help button 110 accesses on screen instructions for operating the default dialing dialog 100. A close button 111 closes the default dialing dialog 100, and also cancels dialing.

As described previously with reference to FIG. 2, the user interface dialog 74 is controlled by the dialer user interface 72. The dialer user interface 72 includes a set of functions which respond to the user's input to the user interface dialog 74 to configure dialing according to the user input, and to dial or cancel dialing in response to the connect and cancel buttons 118, 119.

In the illustrated system 50 shown in FIG. 2, the dialer user interface 72 and user interface dialog 74 are implemented as an installable component of the automatic dialer 70. Further, the dialer user interface 72 and user interface dialog 74 are installable on a per dial-up connection basis. This allows the system to have a separate installable dialer user interface 72 and user interface dialog 74 for each of plural dial-up connections (e.g., dial-up connections to multiple separate Internet access providers or computer networks). Preferably, the network application includes an option which is set by the user through a dialog control or menu for designating one of the dial-up connections as its default connection. The installable dialer user interface and dialog for this default connection is then used in the illustrated system 50 as the dialer user interface 72 and dialog 74.

The installable dialog for each dial-up connection can present a different set of user interface controls, and graphical and textual prompts. This allows the particular dial-up connection to be more readily identifiable by the user, or in other words, the separate computer networks or Internet access providers can "brand" an installable dialog with their name and logo. This also allows user interface controls to be included in the dialog for setting configuration options that are specific to a particular dial-up connection. For example, commercial on-line services, Internet access providers, and corporate "intra-nets" can all provide branded dialogs with configuration options specific to their own dial-up connections. Additionally, with the dialer user interface implemented as a separate installable component, software developers can add a new dialer user interface and dialog (such as for a new dial-up connection) to an existing Windows sockets 52 and automatic dialer 70 without having to modify the existing Windows sockets and automatic dialer or write a new Windows sockets and automatic dialer from "scratch."

Each installable dialer user interface 72 in the illustrated system 50 is implemented as a DLL that exports an interface to a dial user interface handler function having the following form:

```
BOOL WINAPI DialUIHandler(HWND hwndParent,LPCSTR
    pszEntryName,DWORD dwFlags,LPDWORD pdwRetCode);
``` where the "hwdparent" parameter specifies a parent window handle, the "pszEntryName" parameter specifies a name of an RNA connection to use, the "dwFlags" parameter is reserved in the illustrated embodiment for future use, and the "pdwRetCode" parameter specifies a pointer to a double word (DWORD) type data that receives a resulting RNA status code.

The dial user interface handler function responds to a call from the automatic dialer 70 to this interface by displaying the user interface dialog 74 (such as the default dialog 100 of FIG. 4) which provides the user the opportunity to configure, confirm or cancel dialing. If the user chooses to connect, the dial user interface handler function preferably utilizes the Windows® 95 RNA subsystem APIs to dial the dial-up connection on the computer's modem. Once the dial-up connection is established, on a dialing error, or if the user chooses to cancel dialing, the dial user interface handler function returns to the automatic dialer 70.

For installing in the automatic dialer, the installable dialer user interface registers the following information in the Windows® system registry:

---

HKEY_CURRENT_USER\RemoteAccess\Profiles\<connection name>
AutodialDllName = <DLL file name>, REG_SZ
AutodialFcnName = <exported name of function>, REG_SZ

--- where <connection name> is the name of the dial-up connection that uses the installable dialer user interface, <DLL file name> is the name of the installable dialer user interface's DLL, and <exported name of function> is the name of the dialer user interface handler function.

A function in the automatic dialer 70 is responsible for loading and calling the installable dialer user interface 72 and dialog 74 based on this registry information. The code for this function, named "CallInstallableDialHandler" in the illustrated embodiment, is listed in the attached Appendix B.

Offline Browsing Mode

Figure 5:
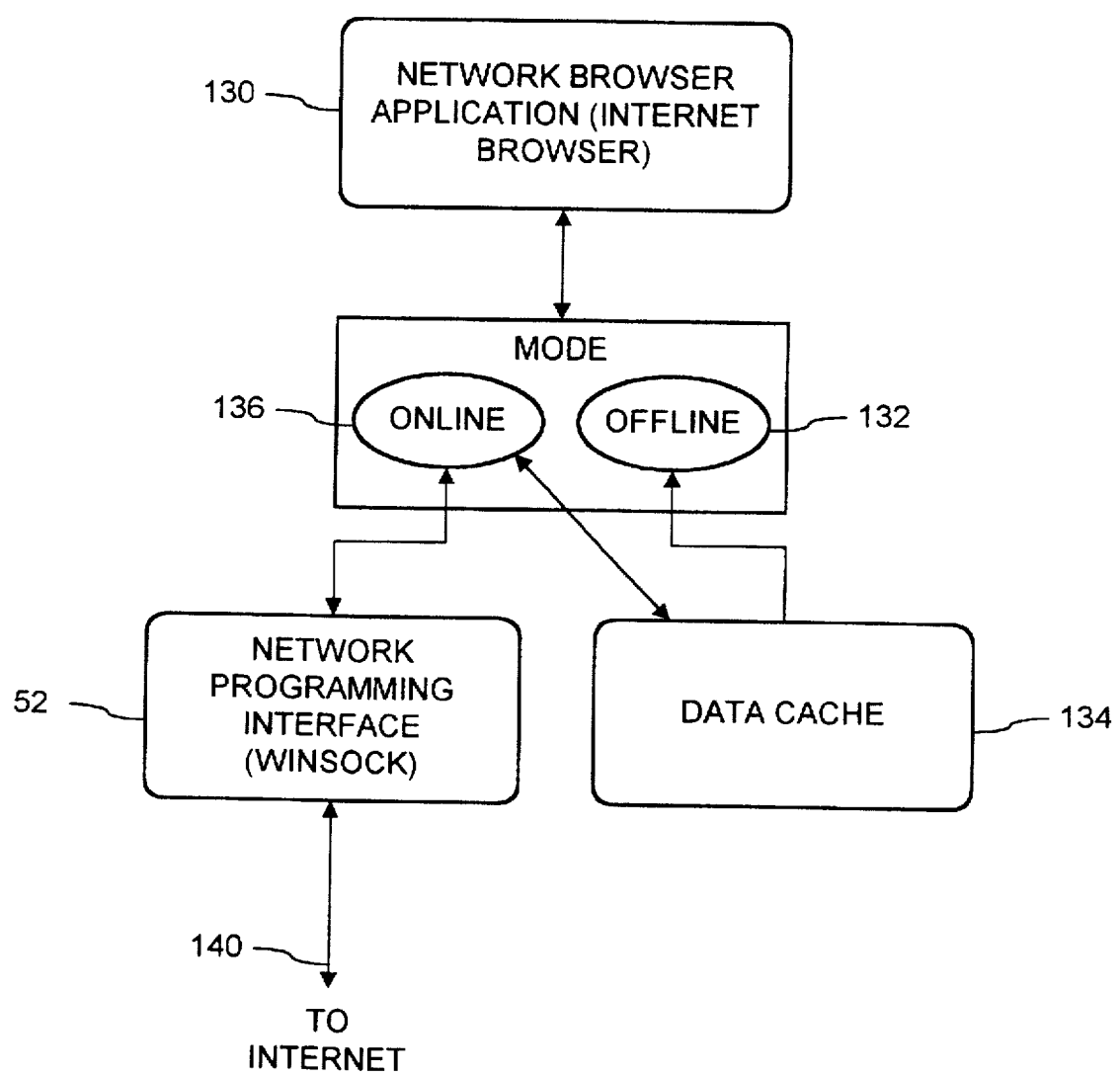
FIG. 5 is a data flow diagram of online and offline modes of a network browser application in the system of FIG. 2.

With reference to FIG. 5, the network application 54 of the illustrated system 50 (FIG. 2) preferably is an Internet or other computer network browser 130 having an offline browsing mode 132. A browser is a software application for interactively retrieving and viewing information (e.g., textual, graphical, audio, video, and other types) from a computer network such as the Internet. In the offline browsing mode 132, the Internet browser 130 provides interactive viewing while the computer system 20 (FIG. 1) is disconnected from the Internet of information previously accessed from the Internet. This allows the computer's user to avoid incurring further online network access charges and telephone usage charges while more leisurely perusing the information. The offline browsing mode 132 also permits the computer's user to view the information at times and places where a dial-up connection may be unavailable (e.g., a mobile computer user in an airplane).

While in the offline browsing mode 132, the illustrated network browser 130 accesses information for viewing by the user from a data cache 134. The data cache preferably is stored in the computer system 20 (FIG. 1) as one or more files in the secondary storage 42 (FIG. 1), generally on a hard disk storage device. The network browser 130 preferably includes a cache size option for the user to set a maximum size of the data cache 134 so as to avoid overfilling the secondary storage 42. When the data cache 134 reaches this maximum limit, the network browser 130 preferably removes information from the data cache in a first-in, first-out order, a least recently used order, or like criteria for maintaining the data cache with recent information.

The network browser 130 initially stores the information in the data cache 134 as the information is accessed by the user from the network while in an online browsing mode 136. While in the online browsing mode, the data cache 132 serves as a performance enhancement which takes advantage of the much faster speed at which information can be retrieved from the local secondary storage 42 as compared to retrieving the information from the Internet. As the user chooses new items of information to view from the Internet, the network browser 130 requests and receives the items from the Internet 140 on the dial-up connection. The network browser 130 stores these items into the main memory 40 (FIG. 1) for presenting to the user and also stores the items into the data cache 134 for ready future access. Because the items also are stored to the data cache 134, the network browser 130 can readily retrieve previously received items from the data cache rather than having to again request them from the Internet. This allows the network browser 130 to more quickly present the previously received items for viewing by the user when the user chooses to go back to viewing those items.

In the offline browsing mode, the computer system 20 (FIG. 1) remains disconnected from the Internet and the network browser 130 accesses only information stored in the data cache 134. Information stored by the network browser 130 into the data cache 134 while in the online mode persist in the secondary storage 42 (FIG. 1) even after the dial-up connection to the Internet is disconnected, and even when the computer system has been turned off. While in the offline browsing mode, the user therefore can view information retrieved from the Internet while previously in the online mode, such as during a previous on-line session, despite any intervening shut down of the computer system 20 (FIG. 1). The user can thus retrieve a number of items from the Internet while in the online browsing mode, then go into the offline browsing mode for more leisurely viewing of the items while disconnected from the Internet.

Figure 6:
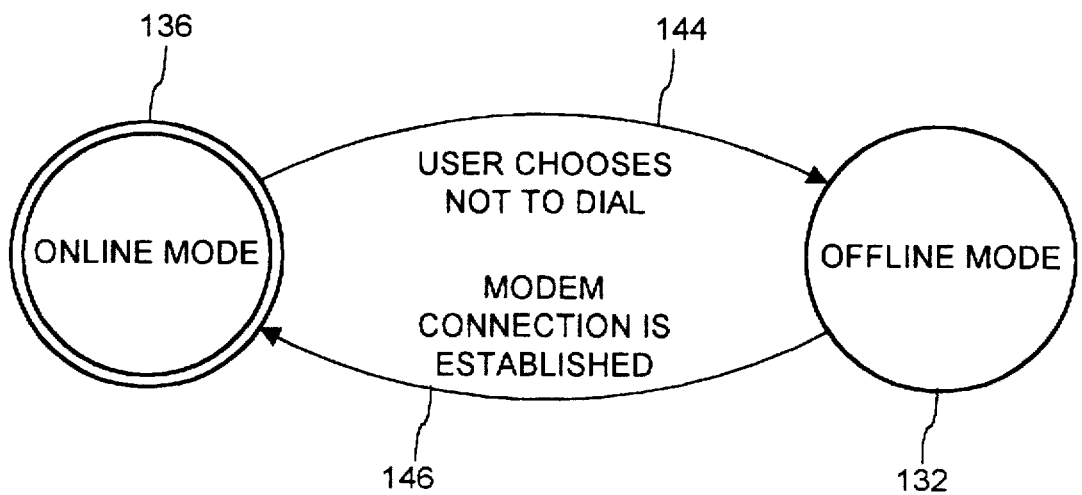
FIG. 6 is a state flow diagram illustrating transitions between online and offline modes of the network browser application in FIG. 5.

With reference now to FIG. 6, the illustrated network browser 130 (FIG. 5) is initially in the online browsing mode 136 at start-up. While in the online browsing mode 136, the autodial method 80 (FIG. 3) is enabled. Thus, if the network browser 130 attempts to access information from the Internet (such as to retrieve information chosen for viewing by the user or a default starting information, e.g., a default starting hypertext markup language (HTML) page), the automatic dialer 70 (FIG. 2) detects the attempt from hooking the network browser's Windows sockets API requests and initiates the dialer user interface 72 (FIG. 2). The dialer user interface 72 presents the user interface dialog 74 (e.g., the default dialog 100 of FIG. 4 or other installable dialing dialog) which allows the user to confirm or cancel dialing. If the user confirms dialing, the dialer user interface 72 establishes the dial-up connection to the Internet and the network browser accesses information from the Internet through the Windows sockets 52 as shown in FIG. 5.

The network browser 130 makes a transition 144 to the offline browsing mode 132 if the user chooses not to dial when prompted to dial by the user interface dialog 74 (FIG. 2) at steps 92–93 in the autodial method 80 (FIG. 3). Whereupon, the network browser 130 retrieves only previously accessed information that is still present in the data cache 132 as shown in FIG. 5. The network browser 130 preferably disables the autodialing method 80 (FIG. 3) while in the offline browsing mode, such as by setting an offline mode flag which is checked at the beginning of the autodial handler function in the automatic dialer 70 so as to return without performing the autodial method when in the offline browsing mode. A dial-up connection therefore is not automatically established by the network browser when in the offline browsing mode.

In the offline browsing mode, the network browser 130 periodically checks whether a dial-up connection has been established (such as by checking the RNA busy value in the system registry as described above). If a dial-up connection is detected, the network browser 130 makes a transition 146 back to the online browsing mode and resumes accessing information from the Internet through the Windows sockets 52 as shown in FIG. 5.

The network browser 130 also can be returned to the online browsing mode 136 by ending and restarting the network browser 130. Since the network browser 130 initially start in the online browsing mode 136, restarting the network browser 130 is another way to return the network browser 130 to the online browsing mode 136.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

APPENDIX A
WINDOWS SOCKETS CODE FOR LOADING
INSTALLABLE AUTOMATIC DIALER

```
// LoadAutodialDll
//
// Looks in registry to see if DLL is registered as an autodial hook.
// Loads the DLL and gets function address. Uses globals
ghInstAutodialDll
// and g_pfnAutoDialHook to store DLL handle and proc address.
//
// Returns TRUE if an autodial DLL is successfully loaded, FALSE
otherwise.
//
BOOL LoadAutodialDll(VOID)
{
    HKEY hKey;
    BOOL fRet = FALSE;

// open the registry key and see if there is an autodial DLL
installed
    if (RegOpenKey(HKEY_LOCAL_MACHINE,szRegPathAutoDial,&hKey) ==
ERROR_SUCCESS) {
        CHAR szFileName[MAX_PATH+1];
        CHAR szFunctionName[MAX_AUTODIAL_FCN_NAME+1];
        DWORD dwFileNameSize=sizeof(szFileName);
        DWORD dwFunctionNameSize=sizeof(szFunctionName);

// get the DLL name and exported function name from the registry
        if ( (RegQueryValueEx(hKey,szRegValAutoDialDLL,NULL,NULL,
            szFileName,&dwFileNameSize) == ERROR_SUCCESS) &&
            (RegQueryValueEx(hKey,szRegValAutoDialFcn,NULL,NULL,
            szFunctionName,&dwFunctionNameSize) == ERROR_SUCCESS) &&
            lstrlen(szFileName) && lstrlen(szFunctionName)) {

// should not have a DLL already loaded
            DLL_ASSERT(!ghInstAutodialDll);
```

```
            if (ghInstAutodialDll) {
                FreeAutodialDll();
            }

5           // load the specified DLL
            ghInstAutodialDll = LoadLibrary(szFileName);
            DLL_ASSERT(ghInstAutodialDll);
            if (ghInstAutodialDll) {

10              // get the address of the autodial function
                g_pfnAutoDialHook = (AUTODIALHOOK)
                    GetProcAddress(ghInstAutodialDll,szFunctionName);
                DLL_ASSERT(g_pfnAutoDialHook);

15              if (g_pfnAutoDialHook) {
                    // successfully loaded DLL and got proc address
                    fRet = TRUE;
                } else {
                    // loaded DLL but proc wasn't there, unload the DLL
20                  FreeAutodialDll();
                }
            }
        }

25      RegCloseKey(hKey);
        } return fRet;
    }
30
    // FreeAutodialDll
    //
    // Frees the autodial hook DLL if loaded and sets global variables to
    NULL.
35  //

VOID FreeAutodialDll(VOID)
```

```
    {
        if (ghInstAutodialDll) {
            FreeLibrary(ghInstAutodialDll);
            ghInstAutodialDll = NULL;
            g_pfnAutoDialHook = NULL;
        }
    }
```

APPENDIX B
AUTOMATIC DIALER CODE FOR LOADING
INSTALLABLE DIALER USER INTERFACE

```
/******************************************************
*

NAME:         CallInstallableDialHandler

SYNOPSIS:     Checks the registry to see if a dial handler is
    installed
                  for the specified RNA entry (connectoid). If so, loads
    the
                  dll and calls the function.

ENTRY:        hwndParent - parent window
                  pszEntryName - name of RNA entry
                  pdwRet - pointer to DWORD filled in at exit with RNA
    error
                  code. This return code only valid if function returns
                  TRUE.

EXIT:         returns TRUE if the dll is registered, we called its
    function
                  and the dll processed the dialing. Returns FALSE if a
                  dll was not registered or did not want to process the
    dialing.

NOTES:        Note that a TRUE return value does not necessarily mean
    that
                  we are connected; for instance, the dialer could have
    dialed
                  but the number might have been busy. Caller needs to
    check
                  code pdwRet to determine if connection succeeded.
```

SAW/jkj 3382-44261 MS39277                    - 36 -                              PATENT
    47
*******************************************************************
*/
BOOL CallInstallableDialHandler(HWND hwndParent,LPSTR
pszEntryName,DWORD *
           pdwRet)
{
    ASSERT(pszEntryName);
    ASSERT(pdwRet);

*pdwRet = ERROR_SUCCESS;
    BOOL fRet = FALSE;

// look in registry for this RNA entry and see if an autodial handler is
    // installed for this entry.
    HKEY hkeyProfile;
    if
(RegOpenKey(HKEY_CURRENT_USER,szRegPathRNAProfile,&hkeyProfile) ==
         ERROR_SUCCESS) {
        HKEY hkeyEntry;
        if (RegOpenKey(hkeyProfile,pszEntryName,&hkeyEntry) ==
ERROR_SUCCESS) {
            CHAR szDllName[MAX_PATH+1]="";
            CHAR szFcnName[MAX_AUTODIAL_FCNNAME+1]="";
            DWORD
cbDllName=sizeof(szDllName),cbFcnName=sizeof(szFcnName);
            if
((RegQueryValueEx(hkeyEntry,szRegValAutodialDllName,NULL,NULL,
              (LPBYTE) szDllName,&cbDllName) == ERROR_SUCCESS) &&

(RegQueryValueEx(hkeyEntry,szRegValAutodialFcnName,NULL,NULL,
              (LPBYTE) szFcnName,&cbFcnName) == ERROR_SUCCESS) &&
              cbDllName && cbFcnName) {

// there is a dll and function name specified for this RNA
                // entry. Try to load the dll and get the proc address.

```
                HINSTANCE hinstDialerDll = LoadLibrary(szDllName);
                if (hinstDialerDll) {
                    INETDIALHANDLER lpInetDialHandler;

lpInetDialHandler = (INETDIALHANDLER)
                    GetProcAddress(hinstDialerDll,szFcnName);

if (lpInetDialHandler) {
                        fRet = (lpInetDialHandler)(hwndParent,
                            pszEntryName,0,pdwRet);
                    }

FreeLibrary(hinstDialerDll);
                }
            }

RegCloseKey(hkeyEntry);
        }

RegCloseKey(hkeyProfile);
    } return fRet;
}
```

I claim:

1. In a computer having a modem, a system for automatically dialing to establish a dial-up connection to a remote computer network, comprising:

a network programming interface having a set of application programming interfaces that can be invoked to provide communications services with the remote computer network; and an installable automatic dialer for hooking requests to the application programming interfaces, for determining based on the requests whether a network application is attempting to communicate with the remote computer network, and if so, for initiating dialing by the modem to establish the dial-up connection whereby the dial-up connection to the remote computer network is automatically established when the network application attempts to communicate with the remote computer network using the network programming interface.

2. The system of claim 1 wherein the installable automatic dialer has an automatic dialing handler and a hook interface for the automatic dialing handler, the hook interface having a first parameter for specifying which of the application programming interfaces was called in a request by the network application to the network programming interface and a second parameter for specifying a parameter value related to the request, the network programming interface calling the hook interface to notify the installable automatic dialer of the request.

3. The system of claim 2 wherein the installable automatic dialer exports the hook interface through a system registry entry for installing in the network programming interface.

4. The system of claim 1 wherein the installable automatic dialer is installable in the network programming interface whereby the installable automatic dialer can be separately implemented from the network programming interface.

5. The system of claim 1 wherein the network programming interface comprises a connect application programming interface and a receive from application programming interface, the connect and receive from application programming interfaces each having an address parameter, and wherein the installable automatic dialer comprises:

means for checking whether a dial-up connection exists;

means for detecting that a request by the network application to one of the connect and receive from application programming interfaces has an address parameter that specifies an address of a type for communicating on the remote computer network; and means for initiating dialing by the modem when the checking has negative result and the detecting has a positive result.

6. The system of claim 1 wherein the network programming interface comprises a get host by name application programming interface having an host name parameter, and wherein the installable automatic dialer comprises:

means for checking whether a dial-up connection exists;

means for detecting that a request by the network application to the get host by name application programming interface has a host name parameter that specifies a name other than a local host name; and means for initiating dialing by the modem when the checking has negative result and the detecting has a positive result.

7. The system of claim 1 wherein the network programming interface comprises a get host by address application programming interface, and wherein the installable automatic dialer comprises:

means for checking whether a dial-up connection exists;

means for detecting a request by the network application to the get host by address application programming interface; and means for initiating dialing by the modem when the checking has a negative result and the detecting has a positive result.

8. The system of claim 1 comprising:

a dialing user interface having a dialog with controls for a user to confirm or cancel dialing and responsive to the installable automatic dialer initiating dialing to cause the modem to dial if the user confirms dialing.

9. The system of claim 8 comprising:

a data cache for storing information previously retrieved by the network application from the remote computer network;

the network application having an offline browsing mode wherein the computer is disconnected from the remote computer network and the network application accesses the information from the data cache; and the dialing user interface causing the network application to enter the offline browsing mode if the user cancels dialing.

10. The system of claim 1 comprising:

plural dialing user interfaces for installing in the installable automatic dialer on a per dial-up connection basis, at least one of the dialing user interfaces being specific to a particular dial-up connection, each of the dialing user interfaces having a dialog with controls for a user to confirm or cancel dialing and responsive to the installable automatic dialer initiating dialing to cause the modem to dial if the user confirms dialing.

11. The system of claim 1 wherein the remote computer network is the Internet.

12. A method of automatically dialing to establish a dial-up connection to a remote computer network for a network application to communicate with the remote computer network, comprising:

installing a hook function interface into a network programming interface to monitor requests to a set of application programming interfaces of the network programming interface that can be invoked to provide communications services with the remote computer network;

checking whether a dial-up connection exists;

detecting a request to the application programming interfaces that is indicative of attempting to communicate with the remote computer network; and initiating dialing to establish the dial-up connection if such a request is detected and no dial-up connection exists.

13. The method of claim 12 wherein the application programming interfaces include a connect interface and a receive from interface each having an address parameter, the method comprising:

detecting that the request is indicative of attempting to communicate with the remote computer network if the request is to the one of the connect and receive from interfaces whose address parameter specifies an address of a type for communicating with the remote computer network.

14. The method of claim 12 wherein the application programming interfaces include a get host by name interface having a host name parameter, the method comprising:

detecting that the request is indicative of attempting to communicate with the remote computer network if the request is to the get host by name interface whose host name parameter specifies other than a local host name.

15. The method of claim 12 wherein the application programming interfaces include a get host by address interface, the method comprising:

detecting that the request is indicative of attempting to communicate with the remote computer network if the request is to the get host by address interface.

16. The method of claim 12 comprising:

enabling automatic dialing when in an online browsing mode;

prompting a user to confirm or cancel dialing when dialing is initiated;

switching from an online browsing mode to an offline browsing mode if the user cancels dialing; and disabling automatic dialing to establish the dial-up connection when in the offline browsing mode.

17. The method of claim 16 comprising:

storing information accessed by the network application from the remote computer network when in the online browsing mode into a data cache; and upon switching to the offline browsing mode, accessing the information from the data cache instead of from the remote computer network.

18. In a computer having a network device, a system for automatically dialing to establish a temporary connection to a remote computer network with the network device, comprising:

a network programming interface having a set of application programming interfaces that can be invoked to provide communications services with the remote computer network; and an installable automatic temporary connection initiator for hooking requests to the application programming interfaces, for determining based on the requests whether any network application is attempting to communicate with the remote computer network, and if so, for initiating creating a temporary connection to the remote computer network by the network device whereby the temporary connection to the remote computer network is automatically established when the network application attempts to communicate with the remote computer network using the network programming interface.

19. The system of claim 18 wherein the installable automatic temporary connection initiator is installable in the network programming interface whereby the installable automatic temporary connection initiator can be separately implemented from the network programming interface.

20. The system of claim 18 wherein the network programming interface comprises a connect application programming interface and a receive from application programming interface, the connect and receive from application programming interfaces each having an address parameter, and wherein the installable automatic temporary connection initiator comprises:

means for checking whether a temporary connection to the remote computer network exists;

means for detecting that a request by the network application to one of the connect and receive from application programming interfaces has an address parameter that specifies an address of a type for communicating on the remote computer network; and means for initiating creating the temporary connection to the remote computer network by the network device when the checking has negative result and the detecting has a positive result.

21. The system of claim 18 wherein the network programming interface comprises a get host by name application programming interface having an host name parameter, and wherein the installable automatic temporary connection initiator comprises:

means for checking whether a temporary connection to the remote computer network exists;

means for detecting that a request by the network application to the get host by name application programming interface has a host name parameter that specifies a name other than a local host name; and means for initiating creating the temporary connection to the remote computer network by the network device when the checking has negative result and the detecting has a positive result.

22. The system of claim 18 wherein the network programming interface comprises a get host by address application programming interface, and wherein the installable automatic temporary connection initiator comprises:

means for checking whether a temporary connection to the remote computer network exists;

means for detecting a request by the network application to the get host by address application programming interface; and means for initiating creating the temporary connection to the remote computer network by the network device when the checking has negative result and the detecting has a positive result.

23. The system of claim 18 comprising:

a user interface having a dialog with controls for a user to confirm or cancel creating the temporary connection by the network device;

a data cache for storing information previously retrieved by the network application from the remote computer network;

the network application having an offline browsing mode wherein the computer is disconnected from the remote computer network and the network application accesses the information from the data cache; and the user interface causing the network application to enter the offline browsing mode if the user cancels creating the temporary connection.

24. A network browsing application having an online browsing mode and an offline browsing mode for a computer system having a set of application programming interfaces that can be invoked to provide communications services for communicating on a dial-up connection with a remote computer network, comprising:

a data cache for storing recent information received from the remote computer network when in the online browsing mode;

a browser for viewing information from the remote computer network responsive to user input, the browser operative when in the online browsing mode to call the application programming interfaces to communicate on the dial-up connection with the remote computer network to access the information, the browser operative when in the offline browsing mode to access the information from the data cache; and an automatic dialer for monitoring calls from the online mode browser to the application programming interfaces to detect an attempt by the online mode browser to communicate with the remote computer network while the dial-up connection is disconnected and for dialing to establish the dial-up connection when such attempt is detected.

25. The network browsing application of claim 24 comprising:
   a user interface control for switching to the offline browsing mode responsive to user input.

26. The network browsing application of claim 24 comprising:
   a dialing user interface having a first control responsive to user input for confirming dialing by the automatic dialer, and a second control responsive to user input for canceling dialing by the automatic dialer and switching to the offline browsing mode.

27. The network browsing application of claim 26 wherein the remote computer network is the Internet.

28. The network browsing application of claim 24 which is initially in the online browsing mode on start-up.

29. An automatic dialer stored on a computer readable medium for automatically dialing to establish a dial-up connection to a remote computer network for a network application to communicate with the remote computer network, the automatic dialer comprising:

code for installing a hook function interface into a network programming interface to monitor requests from the network application to a set of application programming interfaces of the network programming interface that can be invoked to provide communications services with the remote computer network;

code for checking whether a dial-up connection exists;

code for detecting when the network application makes a request to the application programming interfaces that is indicative of attempting to communicate with the remote computer network; and code for initiating dialing to establish the dial-up connection if the network application makes such a request and no dial-up connection exists.

* * * * *